United States Patent Office 3,290,261
Patented Dec. 6, 1966

3,290,261
FOAMED RESIN COMPRISING AROMATIC POLYCARBONATE AND OXYMETHYLENE POLYMER
Kenneth B. Goldblum, Pittsfield, Mass., assignor to General Electric Company, a corporation of New York
No Drawing. Filed Aug. 22, 1963, Ser. No. 303,941
6 Claims. (Cl. 260—2.5)

This invention relates to foamed resins and more particularly is concerned with the production of foamed polycarbonate resin compositions.

Aromatic carbonate polymers are well known, commercially available materials having a variety of applications in the plastics industry. Such carbon polymers may be prepared by reacting a dihydric phenol, such as 2,2 bis-(4-hydroxyphenyl)-propane, with a carbonate precursor such as phosgene, in the presence of an acid binding agent. Generally speaking, aromatic polycarbonate resins offer a high resistance to the attack of mineral acids, may be easily molded, and are physiologically harmless as well as stain resistant. In addition, such polymers have a high tensile and impact strength, high heat resistance, and a dimensional stability far surpassing that of any other thermoplastic material.

As far as I am aware, however, foamed aromatic polycarbonate resins have heretofore not been prepared commercially. By virtue of the present invention, it is now possible to enlarge the commercial application of aromatic polycarbonate resins in the manufacture of polycarbonate foams possessing excellent low thermal conductivity and high temperature resistance.

It is, therefore, a primary object of my invention to provide a high-strength, high-temperature-resistant polycarbonate resin foam.

A further object of my invention is to provide a new and improved process for preparing such polycarbonate resin foam material.

Briefly stated, I have found that when a minor proportion of polyacetal resin is added to a polycarbonate resin and the mixture is heated to above its softening temperature, a foamed polycarbonate resin is obtained. In accordance with my invention it has been found that such highly desirable foamed polycarbonate resins may be obtained when the polyacetal is added to the polycarbonate resin in a minor amount, i.e., from about 0.10% to about 20% by weight (of the polycarbonate resin and the polyacetal) to provide the foamable resin mixture. Generally speaking, where the amount exceeds about 20%, the mixture begins to lose the beneficial properties of the polycarbonate. Preferably, the polyacetal is added in amounts ranging from about 0.25% to about 10% of the total weight of the polyacetal and the polycarbonate. Such addition may be accomplished in any manner so long as a thorough distribution of the polyacetal in the polycarbonate resin is obtained. For example, the mixing of the materials may be accomplished by any of the methods normally employed by those skilled in the art for the incorporation of plasticizers or fillers into thermoplastic polymer materials. The resulting foamable mixtures may be handled in any conventional manner employed for the fabrication or manipulation of thermoplastic resins. The materials may be formed or molded using compression, injection, calendering and extrusion techniques to provide foamed polycarbonate products. It should be understood that the foamable resin mixtures prepared in accordance with the invention may also contain, in addition to the polycarbonate and the polyacetal, other additives to lubricate, prevent oxidation, or lend color to the material. Such additives are well known in the art and may be incorporated without departing from the scope of the invention.

The fact that the addition of a minor proportion of a polyacetal resin to a polycarbonate resin system provides a foamable resin mixture is totally unexpected and is not fully understood. For example, polyacetal or polyoxymethylene resins are stable polyformaldehyde materials, and would not be expected to produce a foamable mixture when admixed with a polycarbonate resin. In addition, I have found that polyacetal resins are unique in this respect. For example, it has been found that other materials based on formaldehyde, such as hexamethylenetetramine and paraformaldehyde (paraform) will not, when added to a polycarbonate resin system in amounts of up to 20%, by weight, produce a resin mixture which, upon heating, provides a foamed polycarbonate.

Generally speaking, the polyacetal resins which are admixed with polycarbonate resins to provide the foamable resin mixtures of the invention are themselves well known, commercially available thermoplastic resin materials. In general, such polyacetal resins may be described as polyoxymethylene polymers and copolymers containing within their linear chain recurring structural units of the formula

Such materials are characterized by a melting point ranging from about 325–480° F., a specific gravity of from about 1.410 to about 1.425, a tensile strength ranging from about 12,000 p.s.i. to about 14,000 p.s.i. and a molecular weight of from about 30,000 to about 50,000. Specific directions for preparing such polyacetals as well as starting materials and polymers prepared therefrom may be found in U.S. Patents 2,768,994 and 3,027,352. Such materials are marketed commercially under the trademarks Delrin by the E. I. du Pont de Nemours and Company, and Celcon by the Celanese Corporation of America.

The temperatures to which the foamable polycarbonate-polyacetal resin mixtures of the invention are heated to provide a foamed polycarbonate will vary within a wide range, depending upon the amount and type of the particular polyacetal resin that is used. In general, I have found that heating the mixture to a temperature of the order of about 350° F. and preferably above 400° F., is advantageous to initiate the foam producing reaction promptly.

The aromatic carbonate polymers used to provide the foamable polycarbonate mixtures of the present invention may be prepared by reacting a dihydric phenol with a carbonate precursor such as phosgene, a haloformate or a carbonate ester. Generally speaking, such carbonate polymers may be typified as possessing recurring structural units of the formula

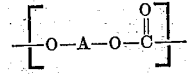

where A is a divalent aromatic radical of the dihydric phenol employed in the polymer producing reaction. Preferably, the carbonate polymers used to provide the resin mixtures of the invention have an intrinsic viscosity (as measured in p-dioxane in deciliters per gram at 30° C.) ranging from about 0.35 to about 0.75. The dihydric phenols which may be employed to provide such aromatic carbonate polymers are mononuclear or polynuclear aromatic compounds, containing as functional groups, 2 hydroxyl radicals, each of which is attached directly to a carbon atom of an aromatic nucleus. Typical dihydric phenols are 2,2 bis-(4-hydroxyphenyl)-propane; hydroquinone; resorcinol; 2,2 bis-(4-hydroxyphenyl)-pentane; 2,4′ dihydroxydiphenyl methane; bis-(2-hydroxyphenyl) methane; bis-(4-hydroxyphenyl)-methane; bis-(4-hydroxyphenyl)-methane; bis-(4-hydroxy 5 nitrophenyl)-methane, 1,1 bis-(4-hydroxyphenyl)-ethane; 3,3 bis-(4-hydroxyphenyl)-pentane; 2,2' dihydroxydiphenyl; 2,6 dihydroxy naphthalene; bis-(4-hydroxyphenyl) sulfone; 2,4' dihydroxydiphenyl sulfone; bis-(4-hydroxyphenyl diphenyl disulfone; 4,4' dihydroxydiphenyl ether; and 4,4' dihydroxy-2,5-diethoxydiphenyl ether. A variety of additional dihydric phenols which may be employed to provide such carbonate polymers are disclosed in U.S. Patent 2,999,835—Goldberg, assigned to the assignee of the present invention. It is, of course, possible to employ two or more different dihydric phenols or a dihydric phenol in combination with a glycol, a hydroxy or acid terminated polyester, or a dibasic acid in the event a carbonate copolymer rather than a homopolymer is desired for use in the preparation of the polycarbonate mixtures of the invention. More specific directions for preparing polycarbonate resins as well as other starting materials and polymers prepared therefrom may be found in Canadian Patent 661,282 and in U.S. Patent 3,030,331, assigned to the assignee of this invention.

In order that those skilled in the art may better understand how the present invention may be practiced, the following examples are given by way of illustration and not by way of limitation. All parts and percentages are by weight unless otherwise noted.

*Example 1*

784 parts of poly p,p' (2,2 diphenylpropane)-carbonate (in the form of pellets) having an intrinsic viscosity of 0.54 (in dioxane at 30.3° C.) were placed in a container and 16 parts of a polyacetal having a molecular weight of about 35,000 and a specific gravity of about 1.4 (sold commercially by the Du Pont Company under the trademark Delrin) were added to the container. The mixture was agitated and subsequently dried at 125° C. for about 4 hours. Subsequently, the mixture was fed to a 1⅛" John Royle extruder which was set at 480° F. for all zones. The extrudate which emerged from the die was very foamy and the smell of formaldehyde emanated from the material. The extrudate was then chopped into pellet form in a Hartig chopper. The volume of the resulting pellets was over four times the volume of the original pellets fed to the John Royle extruder despite some squeezing-down occasioned by the chopper rolls. The structure of the foamed pellets exhibited cellular formations which in some cases were closed off by cell walls and in other cases extended through the pellet section from end to end.

*Example 2*

By the method of Example 1, the following polycarbonate-polyacetal mixtures were perpared:

Sample: Composition

A ____ 1% polyacetal,[a] 99% carbonate copolymer.[b]
B ____ 0.5% polyacetal,[a] 99.5% carbonate copolymer.[c]
C ____ 0.25% polyacetal,[a] 99.75% polycarbonate.[d]
D ____ 5% polyacetal,[a] 75% polycarbonate.[d]
E ____ 0.1% polyacetal,[a] 99.9% polycarbonate.[d]
F ____ 0.5% polyacetal,[a] 99.5% polycarbonate.[d]
  mer.[b]

[a] Polyacetal used was the same as described in Example 1.
[b] The carbonate copolymer employed was prepared by phosgenating a mixture of 50 weight percent of bisphenol A and 50 weight percent of poly (neopentyl glycol adipate) having a reduced viscosity of about 0.1–0.15 (measured in chloroform at 30° C.).
[c] The carbonate copolymer used was prepared by phosgenating a mixture containing 40% by weight of resorcinol and 60% by weight of poly (neopentyl glycol adipate) having a reduced viscosity of 0.1–0.15 (measured in chloroform at 30° C.).
[d] Polycarbonate employed was poly p,p' (2,2 diphenyl propane) carbonate having an intrinsic viscosity of 0.58.

The above mixtures were dried overnight at 125° C. and extruded at 500° F. on all zones and chopped into pellets. These pellets were then examined for foaming as indicated by the extent of cloudiness in the normally clear extruded material. The amount of bubbles in a pellet was seen to be in direct proportion to the percent of polyacetal that was present. The pellets extruded from Sample D had a very cloudy, bubbly appearance whereas the pellets extruded from Samples B and C were less bubbly and cloudy.

Samples E and F were extruded into one inch wide film. The film from Sample F was quite bubbly and essentially opaque in appearance. The film from Sample E had a clear appearance due to a lesser concentration of bubbles. The tensile yield, ultimate strength, and modulus using micro tensile specimens cut from these film samples are reported in the table below.

TABLE I

| Sample | Yield (p.s.i.) | Ultimate (p.s.i.) | Modulus (p.s.i.) |
| --- | --- | --- | --- |
| E | 7,000 | 7,700 | 170,000 |
| F | 2,700 | 3,100 | 84,000 |

*Example 3*

The following table illustrates the density of various foamed polycarbonate resin mixtures perpared in accordance with the method outlined in Example 1, and subsequently extruded at 480° F. and chopped into pellets. The densities were determined by completely immersing a sample of the foamed polycarbonate pellets in water to determine their volume, and dividing the weight of the sample in grams by the volume in cubic centimeters. The polycarbonate resin used in each case was poly p,p' (2,2 diphenyl propane) carbonate having an intrinsic viscosity of 0.58 and a density of 1.2. With the exception of Sample L, the polyacetal used was the same as that described in the previous example. The polyacetal of Sample L was a copolymeric polyoxymethylene based on trioxane of the type disclosed in U.S. Patent 3,037,352 and sold commercially by the Celanese Corporation of America under the trademark Celcon. The polyacetals used had a density of 1.4.

TABLE II

| Sample | Composition | Density |
| --- | --- | --- |
| G | 0.25% polyacetal, 99.75% polycarbonate | 1.06 |
| H | 5.0% polyacetal, 95.0% polycarbonate | 0.66 |
| I | 0.1% polyacetal, 99.9% polycarbonate | 1.08 |
| J | 10.0% polyacetal, 90.0% polycarbonate | 1.12 |
| K | 20.0% polyacetal, 80.0% polycarbonate | 1.07 |
| L | 5.0% polyacetal, 95.0% polycarbonate | 0.90 |

As will be appreciated by those skilled in the art, foamed polycarbonate resins prepared in accordance with the present invention have a variety of applications in the plastics industry. By virtue of their low thermal conductivity and high temperature-resistant properties, such polycarbonate resin foams are particularly suitable for use as insulation materials. Because of their high strength, they are particularly useful in the construction industry where high-strength, low density materials are required. Since they are relatively unaffected by water, the polycarbonate foams of the invention offer a high wet strength as well as exceptional buoyancy characteristics. In addition, they may be used in acoustical insulating applications and as core materials for high temperature sandwiches.

What I claim as new and desire to secure by Letters Patent of the United States is:

1. A foamable resin mixture comprising (1) an aromatic polycarbonate resin of a dihydric phenol and a carbonate precursor and (2) about 0.1 to about 20.0 weight percent of an oxymethylene polymer based on the weight of the resin mixture.

2. A foamable resin mixture comprising (1) an aromatic polycarbonate of 2,2-bis-(4-hydroxyphenyl)-propane and (2) about 0.1 to about 20.0 weight percent of an oxymethylene polymer based on the weight of the resin mixture.

3. A foamable resin mixture comprising (1) an aromatic polycarbonate of 2,2-bis-(4-hydroxyphenyl)-propane and (2) about 0.1 to about 20.0 weight percent based on the weight of the resin mixture of a polymer consisting of recurring oxymethylene units of the structure

4. A process for preparing a foamable resin mixture which comprises mixing (1) an aromatic polycarbonate resin of a dihydric phenol and a carbonate precursor and (2) about 0.1 to about 20.0 weight percent of an oxymethylene polymer based on the weight of the resin mixture.

5. A process for preparing a foamed resin which comprises heating to above about 350° F. a mixture comprising (1) an aromatic polycarbonate resin of a dihydric phenol and a carbonate precursor and (2) about 0.1 to about 20.0 weight percent of an oxymethylene polymer based on the weight of the resin mixture.

6. A foamed resin which comprises the product of heating to above about 350° F. a mixture comprising (1) an aromatic polycarbonate resin of a dihydric phenol and a carbonate precursor and (2) about 0.1 to about 20.0 weight percent of an oxymethylene polymer based on the weight of the resin mixture.

References Cited by the Examiner

UNITED STATES PATENTS

| | | | |
|---|---|---|---|
| 2,787,632 | 4/1957 | Stevens | 260—2.5 |
| 3,132,118 | 5/1964 | Butterworth et al. | 260—2.5 |

MURRAY TILLMAN, *Primary Examiner.*

N. F. OBLON, *Assistant Examiner.*